US005857683A

United States Patent [19]

Auel

[11] Patent Number: 5,857,683

[45] Date of Patent: Jan. 12, 1999

[54] CREEPER HAVING LEVER ARMS PROVIDING VARIABLE MECHANICAL ADVANTAGE FOR INCLINING A BACK PORTION

[75] Inventor: Carl C. Auel, Herminie, Pa.

[73] Assignee: Carl Clark Auel Living Will, Herminie, Pa.

[21] Appl. No.: 626,983

[22] Filed: Apr. 3, 1996

[51] Int. Cl.[6] .............................. B25H 5/00; B62B 11/00

[52] U.S. Cl. .................... 280/32.6; 280/79.7; 297/361.1; 297/362; 74/105; 74/517

[58] Field of Search ......................... 280/32.6, 62, 79.11, 280/79.4, 79.7, 32.5, 87.042, 43.14, 43.13; 297/361.1, 362, 363, 374, 375; 74/105, 106, 107, 108, 516, 517

[56] References Cited

U.S. PATENT DOCUMENTS

| | | | |
|---|---|---|---|
| 1,773,597 | 8/1930 | Myerson | 297/361.1 |
| 2,051,563 | 8/1936 | Mance . | |
| 2,054,598 | 9/1936 | Goldenberg . | |
| 2,430,662 | 11/1947 | Barton . | |
| 2,520,047 | 8/1950 | Moody et al. | 280/32.6 |
| 2,564,323 | 8/1951 | Brown . | |
| 2,652,576 | 9/1953 | Clark | 280/32.6 |
| 2,689,744 | 9/1954 | Mullin | 280/32.6 |
| 2,692,636 | 10/1954 | Morrison | 280/32.6 |
| 2,703,717 | 3/1955 | Miller . | |
| 2,780,472 | 2/1957 | Weldon, Sr. . | |
| 2,843,392 | 7/1958 | Simpkins | 280/43.14 |
| 2,861,279 | 11/1958 | Myers | 280/32.6 |
| 4,705,318 | 11/1987 | Yamada et al. | 297/362 |
| 4,895,380 | 1/1990 | Brooks et al. | 280/32.6 |
| 4,957,302 | 9/1990 | Maxwell | 280/32.6 |
| 5,035,378 | 7/1991 | Spanovich | 74/105 |
| 5,086,908 | 2/1992 | Gladish et al. | 74/105 |
| 5,451,068 | 9/1995 | Shockley | 280/32.6 |
| 5,577,744 | 11/1996 | Parks | 280/32.6 |

FOREIGN PATENT DOCUMENTS

| | | |
|---|---|---|
| 2250332 | 7/1975 | France . |
| 8800294 | 12/1988 | WIPO . |

*Primary Examiner*—Brian L. Johnson
*Assistant Examiner*—Bridget Avery
*Attorney, Agent, or Firm*—Clifford A. Poff

[57] ABSTRACT

A creeper having a base and an inclinable back portion and an apparatus for inclining the back, the apparatus including lever arms, pull bars, a sliding member, rocker arms and a sprocket wheel about which a length of chain attached the lever arm rolls. A point of target contact between the chain and sprocket wheel moves along the length of the lever arm resulting in a variable mechanical advantage for a force applied to the lever arm.

16 Claims, 3 Drawing Sheets

CREEPER HAVING LEVER ARMS PROVIDING VARIABLE MECHANICAL ADVANTAGE FOR INCLINING A BACK PORTION

BACKGROUND OF THE INVENTION

1. Field of the Invention

The present invention relates to creepers used by mechanics, and, more particularly, to a creeper having a base and an inclinable back portion.

2. Description of the Prior Art

Creepers having back portions which are inclinable relative to a base portion are well known in the art. Such creepers often incorporate mechanisms which use springs as a source of stored energy to drive the inclination of the back portion, as in U.S. Pat. No. 2,051,563 to Mance and U.S. Pat. No. 2,703,717 to Miller. While these spring type mechanisms offer the desirability of an automatic lifting of the back portion, safety concerns require greater reliability and integrity of locking mechanisms which maintain a selected position of inclination of the back relative to the base. Given that the work environment of a user of a creeper may place the user near high temperature components or machinery in motion, an inadvertent release of the back portion could lead to injury of a user of such a creeper if the spring force causes further inclination of the back portion towards the work object.

Prior art creepers have also incorporated mechanisms for inclining a back portion which include lever arms extending from an edge of the creeper for application of force by the user to incline the back portion. This is found in U.S. Pat. No. 2,054,598 to Goldenberg and U.S. Pat. No. 2,564,323 to Brown. These types of mechanisms avoid the safety concerns involved with the spring type mechanisms discussed previously, in that a release of the locking mechanism will result in travel of the user towards a prone position, and away from the work object, due to gravity forces. However, without the stored energy of the spring, all of the energy required for the inclination of the back portion must come from the force applied to the lever arms by the user of the creeper. As the inclination of the back increases, the force which must be applied to the back portion to gain additional inclination decreases. Therefore, the force necessary for inclination will be at a maximum when the user is in a nearly prone position and would approach zero if inclination were to be continued to a nearly vertical position, since the gravity forces which the user would apply to the back portion would approach zero. Therefore, the mechanical advantage of the lever used to incline the back portion should be maximized during the inclination nearest to the prone position when the required force is at a maximum. None of the prior art which utilizes a lever system incorporates a system in which the mechanical advantage is at a maximum during the initial inclination nearest to the prone position.

Accordingly, it is an object of the present invention to provide a creeper having an inclinable back portion in which the mechanism which provides the inclination utilizes a levered mechanism for which the mechanical advantage for the lever is at a maximum during the portion of the inclination nearest to the prone position when the gravity forces on the back portion will be at a maximum.

SUMMARY OF THE INVENTION

According to the present invention there is provided in a creeper having a base and an inclinable back portion, an apparatus for inclining the back portion. The apparatus includes at least one lever arm having a force receiving portion extending beyond an edge of the creeper to allow for application of a force to the lever arm to move a force transmitting portion of the lever arm extending in the base of the creeper. The apparatus further includes at least one pull bar connected to the force transmitting portion of the lever arm for pivotal movement of the lever arm relative to the pull bar. The apparatus also includes force transmitting means operably supporting said lever arm on said base for transmitting the force applied to the lever arm to the pull bar, the means for transmitting creating a variable length moment arm for the force applied to the lever arm such that a mechanical advantage is at a maximum when the back is in a position of minimum inclination relative to the base. The apparatus also includes means connecting the pull bar to the back portion for inclining the back portion in response to the force imparted to the pull bar by the lever arm.

The force in the pull bar may be transmitted to the back portion by including slide means connected to the pull bar for translation in response to the force imparted to the pull bar and a rocker arm having a first end pivotally connected to the slide means and a second end pivotally connected to one of the base and the inclinable back portion with the slide means being connected to the other of the base and the inclinable back portion.

The means for creating the variable length moment arm along the lever arm may include gear teeth spaced about a circular sector such as may be provided by sprocket wheels fixed to the base, and a gear rack segment such as may be provided by a length of roller chain attached to the lever arm. An area of tangent contact, existing between the gear teeth and the chain as the lever arm is rolled about the outer periphery of the sprocket wheel, will shift along the length of the lever arm creating the variable length moment arm relative to the force receiving portion of the lever arm.

BRIEF DESCRIPTION OF THE DRAWINGS

The present invention will be more fully understood when the following description is read in light of the accompanying drawings in which.

DETAILED DESCRIPTION OF THE PREFERRED EMBODIMENTS

Figure 1:
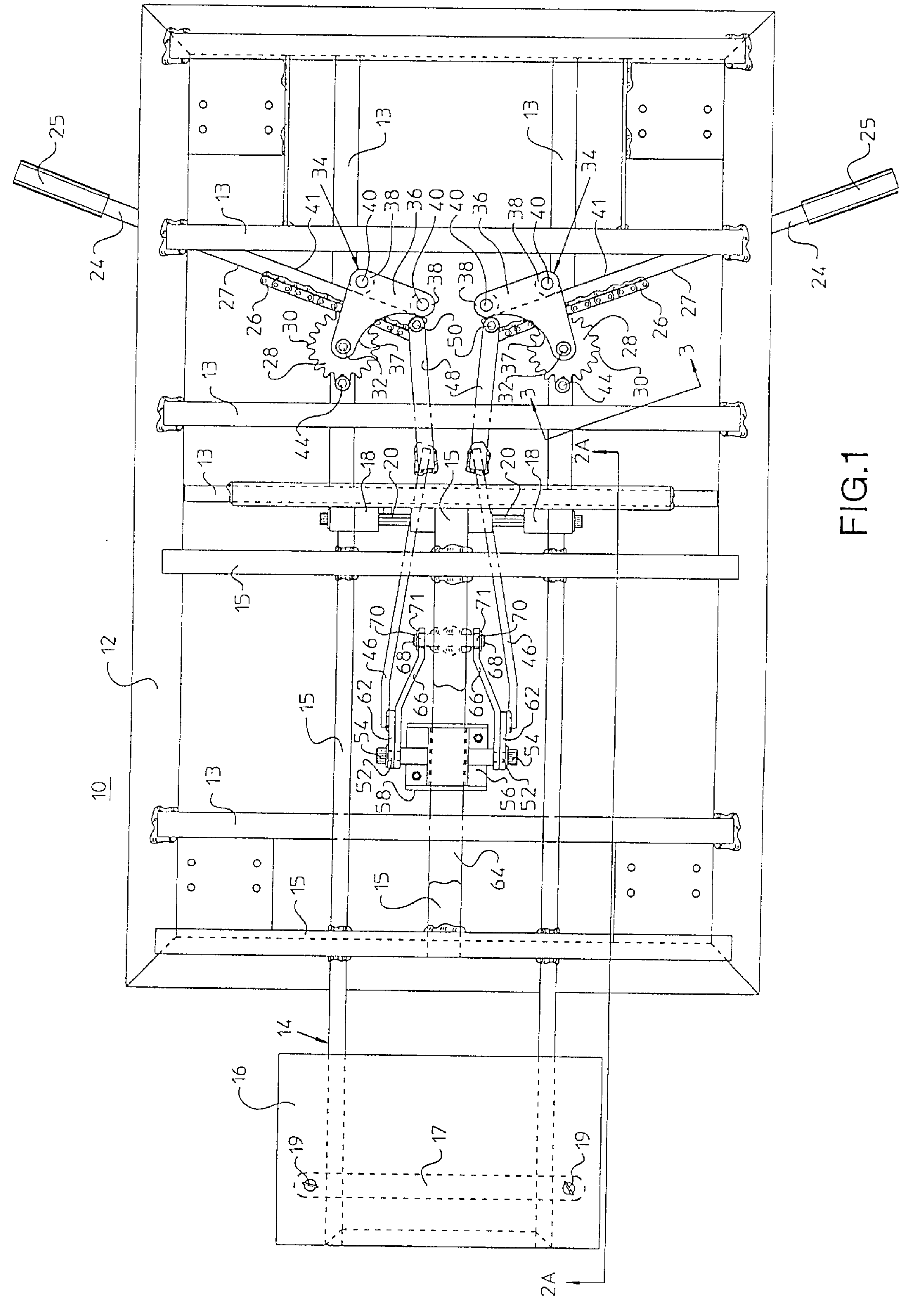
FIG. 1 is a top view of an embodiment of the creeper according to the present invention from which plywood and cushion portions have been removed from the base and the back for clarity.

Referring to FIG. 1, there is shown a creeper 10 having a base portion 12, which includes frame members 13, and an inclinable back portion 14, which includes frame members 15. FIG. 1 is a top view of a creeper having back and base sections from which cushioned plywood sections have been removed from the frame members 13 and 15 for clarity of view. The embodiment shown in FIGS. 1 and 2 incorporates welded metal frame members 13 and 15. It should be noted, however, that other suitable materials of construction could be employed. The back is connected to the base by the collars 18 attached to the base and hinge pins 20 which pass through the collars and through openings in frame elements 15 of the back portion 14. This allows for pivoting of the back 14 relative to the base 12. A suitable connection could also be made, for example, through the use of a hinge plate attached to both the back and the base. Attached to the inclinable back 14 is a headrest 16 which may be made adjustable, as shown, to accommodate users of varying sizes, through the use of a sliding bracket 17 having releasable clamping screws 19. Caster wheels 22, as seen in FIG. 2, which are attached to the base portion 12, give the creeper its customary mobility, allowing a user to comfortably enter and exit a work space having limited vertical clearance.

The novel mechanism according to the present invention for inclining the back portion relative to the base portion includes lever arms 24, which have force receiving portions 25 that extend beyond an edge of the base portion. The force receiving portions 25 allow the hands of a user to apply forces to the lever arms to operate the mechanism of the present invention and lift the back portion relative to the base, as will be described below. Each of the lever arms 24 has attached to it, a gear rack segment having rack teeth, such as may be provided by a length of roller chain 26. The roller chain 26 is attached, as by a welded joint, to an edge 27 of the lever arm 24, which is located in a force transmitting portion of the lever arm opposite the force receiving portion 25. The attachment of the chain to the lever arm ideally extends along the entire length of the chain 26. As an option, it is possible to have the gear rack segment include rack teeth which are machined into the body of the lever arm, as opposed to a separate component requiring attachment.

Figure 2A:
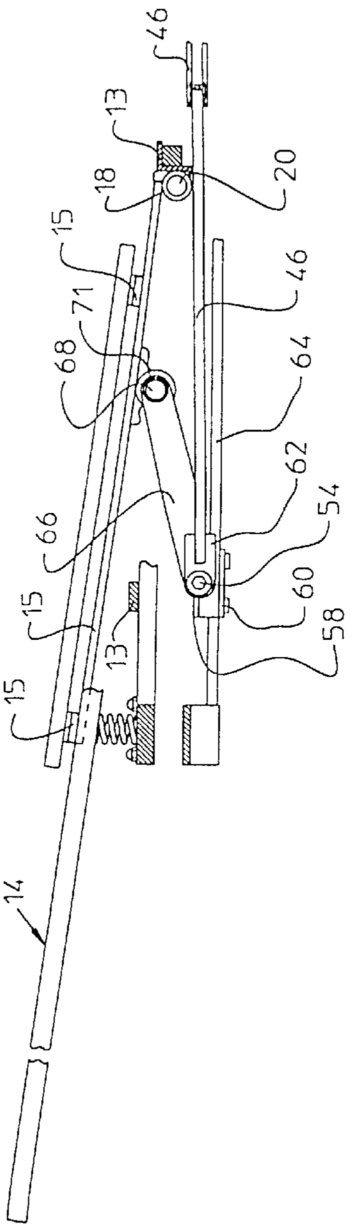
FIG. 2A is a view taken along lines 2A—2A in FIG. 1
Figure 2:
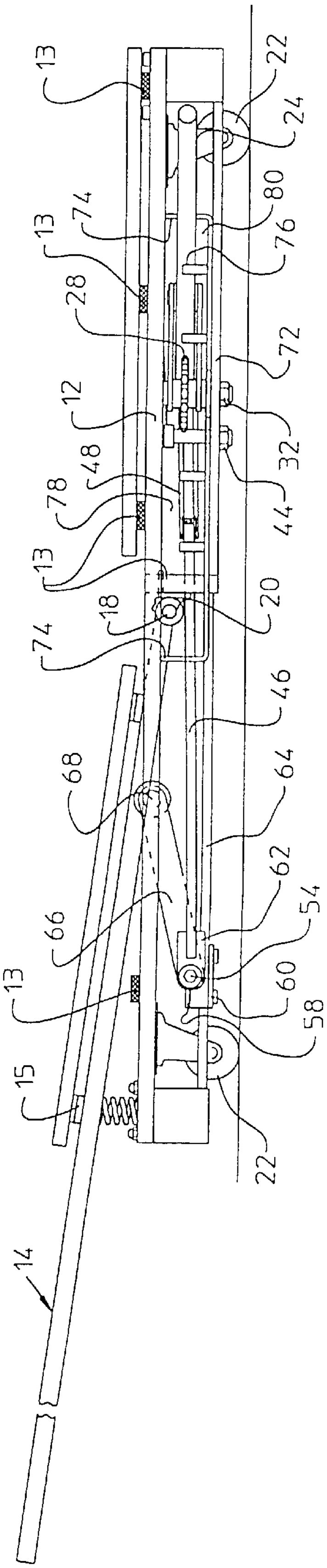
FIG. 2 is a side view of the creeper of FIG. 1 which includes plywood portions attached to the back and base. The inclination of the back portion shown in FIG. 2 is shown only for purposes of viewing the adjacent portions of the inclining apparatus and should not be taken as indicating relative positions of the back portion and the lever arms.
Figure 3:
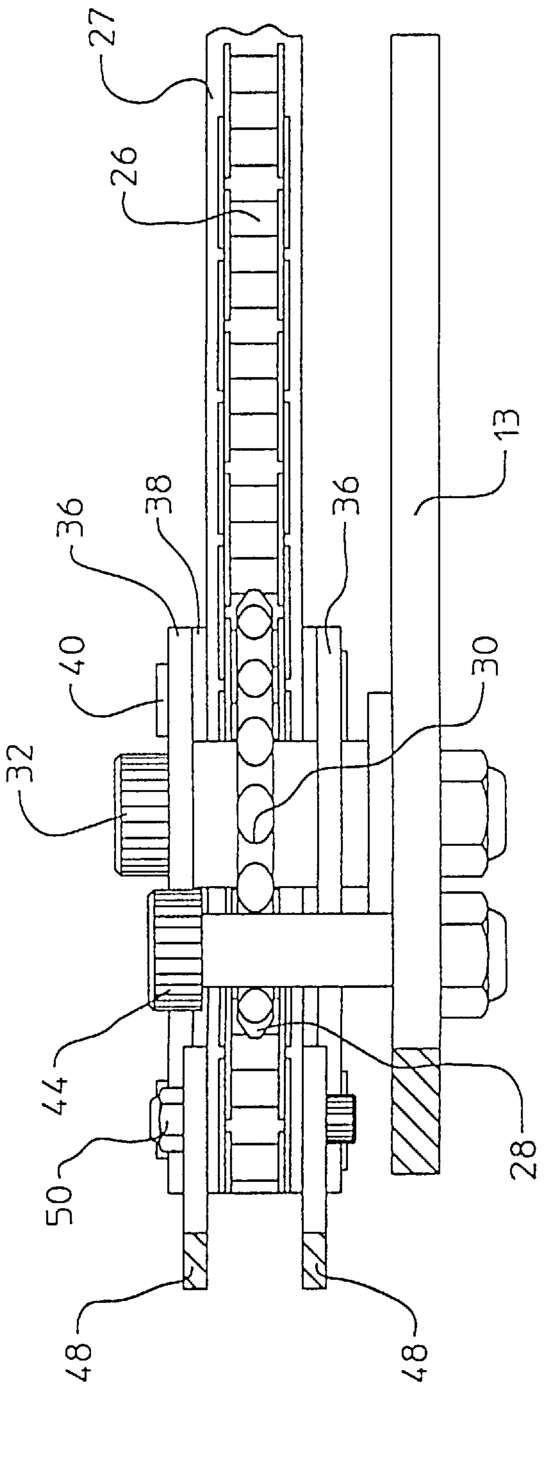
FIG. 3 is a partial side view taken along lines 3—3 FIG. 1.

As shown in FIGS. 1–3, sprocket wheels 28 are connected to the base 12 by socket head cap screws 32. The sprocket wheels have gear teeth 30 which are located about an outer periphery for engagement with the rack teeth of the roller chain 26. The cap screws 32 have shank portions passing through openings near the centers of the sprocket wheels.

Cage members 34, each including a pair of plates 36 in a spaced apart relationship, are connected at an end to the base through the cap screws 32 which connect the sprocket wheels to the base such that the plates 36 are located on opposite sides of a corresponding sprocket wheel 28 with the shank of the cap screws 32 passing through openings in the plates. As shown in FIG. 1, each of the plates 36 has a notched portion 37 located along an edge of the plate, the purpose of which will be discussed below.

Each of the cage members 34 carries a set of support members, such as rollers 38 which are connected by pins through openings 40 in plates 36 located near an end of the cage member opposite the connection of the cage to the base. The pins allow for rotation of the rollers relative to the plates 36 of the cage members 34 for rolling contact between the rollers 38 and edges 41 of the lever arms which are opposite edges 27. It should be noted, however, that the support members need not be rollers, and may consist of block members which are fixed to plates 36 for sliding contact between the blocks and edges 41 of the lever arms.

The use of the shanks of the cap screws 32 to connect the plates 36 of the cage members 34 allow for pivoting of the cage members 34 relative to the base 12. In order to prevent the pivoting of the sprocket wheels 28 relative to the base 12, which are also connected to the base by the same shanks of the cap screws 32, socket head cap screws 44, which serve as rod members, are attached to the base 12 and located such that the shanks of the cap screws 44, which are sized to fit into the space between adjacent gear teeth 30, contact the outer periphery of the sprocket wheels 28 thereby preventing pivoting of the sprocket wheels 28. As can be seen from the Figures, the amount of pivoting of the lever arm 24 associated with the travel of the lever arm during the inclination of the back portion will not require the use of all of the gear teeth around the full circumference of the sprocket wheel. Therefore, it would be possible to use a circular sector as opposed to a fully circular member such as provided by the sprocket wheel 28. The use of a sector, however, would require a different means of support against pivoting than is described above for the sprocket wheel.

The construction of the elements described above allows for rolling of the lever arms 24 about the outer peripheries of the fixed sprocket wheels 28 through contact of the associated roller chains 26 with gear teeth 30. The cage members 34, which can pivot about the sprocket wheels 28, ensure meshing engagement between the roller chain and the gear teeth, because of the contact of the rolling members 38 with the edges 41 of lever arms 24. This meshing engagement establishes an area of tangent contact between the chain and gear teeth as the lever arms 24 are rolled about the fixed sprocket wheels 28. As the lever arm is pivoted, the area of tangent contact between the roller chains 26 and the gear teeth 30 will shift along the length of the chain, and therefore along the length of the associated lever arms 24. This results in a changing moment arm represented by the distance between the point of application of force to a lever arm 24 by the hand of a user of the creeper 10 and the area of tangent contact between the sprocket wheel 28 and the chain. This moment arm, and therefore the mechanical advantage provided by the lever arm, 24 will be at a maximum when the back portion 14 is in a position of minimum inclination relative to the base 12. This means that the maximum mechanical advantage is utilized when the maximum leverage is needed, that is, during that portion of the inclination when the back portion 14 is closest to the base 12 and the user of the creeper 10 is nearest to a prone position.

That portion of the mechanism which includes the sprocket wheels 28, roller chains 26, cage members 34 and roller members 38 is used to transfer the forces which are applied to the lever arms 24 to pull bars 46, each of which has an end connected to an end of lever arm 24 at a pin joint 50 which allows pivoting of the lever arm 24 relative to the pull bar 46 generally in a plane containing the base 12. Each of the pull bars 46 has an end portion which consists of a clevis portion 48, which has a length sufficient to allow access between the arms of the clevis for a portion of the roller chain 26 and a portion of sprocket wheel 28 as the lever arm 24 which is attached to the pull bar is rolled about the outer periphery of a sprocket wheel 28. The presence of the above mentioned notches in cage plates 36 provides access for the ends of lever arms 24 and pull bars 46 adjacent to pin joint 50 which will be located in the notch region when the lever arm 24 is in a starting position associated with the above mentioned maximum leverage.

Pull bars 46 are connected to a slide member 56 at ends of pull bars 46 opposite from clevis portions 48 by socket head cap screws 54 having a shank portion passing through an opening 52 in pull bars 46. Slide member 56 includes an upper u-shaped member 58 into which cap screws 54 are engaged, and a lower keeper plate 60 which is attached to upper member 58 along edges 62. The attachment of upper member 58 and lower plate 60 may be made by any suitable method, including a welded or bolted connection. Interposed between upper member 58 and lower plate 60 is a center bar 64 which is attached to base 12 and upon which slide member 56 is capable of translation generally in the direction of the elongated length of base 12.

Rocker arms 66 are attached to slide member 56 in a fashion similar to the connection of pull bar 46 in which the shank portion of cap screws 54 passes through an opening in an end of rocker arm 66. Such a connection allows for pivoting of rocker arm 66 in a plane generally perpendicular to a plane containing the base 12. Rocker arms 66 are attached at ends opposite the connections to slide member 56 to pin members 68 which are attached to back portion 14 through openings 70 in rocker arms 66. This connection allows for pivoting of rocker arms 66 in a plane generally perpendicular to a plane containing back portion 14. The connection of the rocker arms 66 to pins 68 is maintained by retaining clips 71.

The above discussed pivoting of lever arm 24 about sprocket wheel 28 results in translation of slide member 56 along center bar 64 through action of pull bars 46. The translation of slide member 56, in turn, results in inclination of back portion 14 as seen in FIG. 2A through compressive loading of rocker arms 66.

To provide for holding back portion 14 in multiple positions of inclination relative to base 12, a locking bar 72 is attached along an edge of base 12 adjacent to the area of travel of lever arm 24. The locking bar 72 has upturned ends 74 to which the attachment to base 12 is made. Projections 76 are attached to locking bar 72 at spaced apart locations and are shorter in length than the upturned ends 74 such that a region 78 is created between the upturned ends 74 and between the base 12 and the free ends of projections 76 in which the lever arm 24 may travel freely as it is pivoted about the outer periphery of sprocket wheel 28. When lever arm 24 has been pivoted causing an inclination in back portion 14 of a desired amount, the lever arm 24 may be shifted in a direction perpendicular to a plane containing the base 12, out of the region 78, and into a space 80 between adjacent projections 76. This prevents further travel of lever arm 24 and locks back portion 14 in the desired position of inclination. As will be noted in FIG. 2, the location of locking bar 72 on the underside of an operating creeper means that gravity forces on the lever arm will beneficially tend to maintain the lever arm in the spaces 80 and therefore in a locked position.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

I claim:

1. In a creeper having a base and an inclinable back portion, an apparatus for inclining such back portion including:

(a) at least one lever arm having a force receiving portion extending outwardly beyond one of opposite lateral edges of the base to allow for application of a force to said lever arm to move a force transmitting portion of said lever arm extending in the base;

(b) at least one pull bar connected to the force transmitting portion of said lever arm for pivotal movement of said lever arm relative to said pull bar;

(c) a force transmitter operably supporting said lever arm on said base for transmitting the force applied to said lever arm to said pull bar, said force transmitter providing a variable distance between the force receiving portion of said lever arm and said force transmitter such that a mechanical advantage is at a maximum when said back portion is in a position of minimum inclination relative to said base; and (d) a connector connecting said pull bar to said back portion for inclining said back portion in response to the force imparted to said pull bar by said lever arm.

2. The creeper according to claim 1, wherein said connector includes:

(a) a slide connected to said pull bars for translation in response to the force imparted to said pull bar; and (b) a rocker arm having a first end pivotally connected to said slide and a second end opposite said first end pivotally connected to said inclinable back portion, said slide being connected to said base.

3. The creeper according to claim 2 wherein said rocker arm is arranged for pivoting in a plane generally perpendicular to a plane containing such back portion such that said rocker arm is placed in compression by said translation of said slide.

4. The creeper according to claim 2 wherein said slide includes:

(a) an elongated bar attached to said base having at least one surface extending in the direction of the length thereof; and (b) a guide having at least one surface to direct said guide for reciprocating along the surface of said elongated bar.

5. The creeper according to claim 4 wherein said elongated bar has a rectangular cross section defining pairs of oppositely directed planar surfaces, and wherein said at least one surface to direct said guide includes elongated planar surfaces engagable with the planar surfaces of said elongated bar.

6. The creeper according to claim 5 wherein the elongated planar surfaces of said guide are defined by a member having an elongated u-shaped cavity and a keeper plate having a face surface, said keeper plate being secured to said member.

7. The creeper according to claim 2 further including pin members for forming the pivotal connections for said rocker arm.

8. The creeper according to claim 1 wherein said force transmitter includes:

(a) rack teeth extending along said lever arm adjacent the second end of the lever arm to extend outwardly thereof;

(b) a drive including gear teeth spaced about a central axis of a circular sector secured to such base for meshing engagement with said rack teeth;

(c) a restraint for securing said drive against pivoting about said central axis to such base; and (d) a cage engaged for pivotal support about said central axis, said cage including spaced apart support members engagable with the second end of said lever arm for maintaining a meshing relation between said rack teeth and said gear teeth.

9. The creeper according to claim 8, wherein said pivotal support for said cage includes a shaft secured to such base having a central axis substantially coincident with said circular sector central axis.

10. The creeper according to claim 1 wherein said force transmitter includes:

(a) a length of roller chain attached to the force transmitting portion of said lever arm;

(b) a sprocket wheel having gear teeth about an outer periphery for meshing engagement with said length of roller chain, said sprocket wheel being supported against pivoting by said base;

(c) a cage member including a pair of spaced apart plates supported at opposite sides of said sprocket wheel for pivotal movement relative to the gear teeth of said sprocket wheel; and (d) support members carried by said cage confronting the force transmitting portion of said lever arm for maintaining said meshing engagement, said meshing engagement establishing an area of tangential contact between said sprocket wheel and said chain which shifts along the length of said roller chain as said lever arm is pivoted about said sprocket wheel and said lever arm translates relative to the means for maintaining meshing engagement, the shifting area of tangential contact providing for said variable distance.

11. The creeper according to claim 10 wherein said support members includes a set of roller members confronting a side of the force transmitting portion which is opposite to said roller chain.

12. The creeper according to claim 10 further including a rod member attached to said base having a portion positioned to fit between adjacent gear teeth of said sprocket wheel thereby restraining pivoting of said sprocket wheel.

13. The creeper according to claim 1 further including a lock attached to such base for securing said back portion in at least one position of inclination relative to such base.

14. The creeper according to claim 13 wherein said lock includes at least one elongated bar having opposite turned ends and further having attached projections at spaced apart locations along the length of said bar, the bar being located along an edge of such base and attached to such base at said opposite turned ends, said bar establishing a region between free ends of said projections and such base in which said lever arm may pivot freely generally parallel to a plane containing such base, said projections preventing said pivoting of said lever arm when said lever arm is shifted out of said region in a direction generally perpendicular to said plane containing such base and into a space between adjacent projections.

15. In a creeper having a base and an inclinable back portion, an apparatus for inclining such back portion including:

(a) a pair of lever arms each having a force receiving portion extending outwardly beyond one of opposing edges of the base to allow for application of a force to each of said lever arms to move a force transmitting portion of each of said lever arms extending in said base;

(b) a pair of pull bars each connected to one of the force transmitting portions of said lever arms for pivotal movement of said lever arms relative to said pull bars;

(c) a force transmitter operably supporting said lever arms on said base for transmitting the forces applied to said lever arms to said pull bars, said force transmitter providing variable distance between the force receiving portion of said lever arm and said force transmitter such that a mechanical advantage is at a maximum when said back portion is in a position of minimum inclination relative to said base; and (d) means connecting said pull bars to said back portion for inclining said back portion in response to the forces imparted to said pull bars by said lever arms.

16. An ever changing mechanical advantage system for a force transmitting mechanism including:

(a) a base;

(b) rack teeth extending along a lever arm at one end portion opposite to a force receiving end of said lever arm;

(c) a drive including gear teeth spaced about a central axis of a circular sector secured to said base for meshing engagement with said rack teeth;

(d) a restraint for securing said drive against pivoting about said central axis to said base;

(e) a cage engaged for pivotal support about said central axis, said cage including spaced apart support members engagable with said one end portion of said lever arm for maintaining a meshing relation between said rack teeth and said gear teeth, whereby pivoting of said cage while said rack teeth advance along the end portion of said lever arm in response to a force applied to the force receiving end of said lever arm creates a variable length moment arm for the force applied to said lever arm such that a mechanical advantage is at a maximum when teeth of said rack teeth most adjacent the terminal part of said one end portion engage with the gear teeth of said drive.

* * * * *